United States Patent [19]
Webber et al.

[11] Patent Number: 5,815,023
[45] Date of Patent: Sep. 29, 1998

[54] UNBALANCED MULTIPLEXER AND ARBITER COMBINATION

[75] Inventors: Thomas P. Webber, Petersham, Mass.; Ting-Chuck Chiang, Sunnyvale, Calif.

[73] Assignee: Sun Microsystems, Inc., Mountain View, Calif.

[21] Appl. No.: 821,266

[22] Filed: Mar. 20, 1997

[51] Int. Cl.$^6$ .................................................... H03K 17/62
[52] U.S. Cl. .......................................... 327/407; 327/408
[58] Field of Search .................................... 327/407, 408, 327/410; 365/189.02, 230.02

[56] References Cited

U.S. PATENT DOCUMENTS

| | | | |
|---|---|---|---|
| 5,510,742 | 4/1996 | Lemaire | 327/146 |
| 5,552,745 | 9/1996 | Pelella et al. | 327/407 |

*Primary Examiner*—Vu A. Le
*Attorney, Agent, or Firm*—Beyer & Weaver, LLP

[57] ABSTRACT

A method and apparatus for high speed signal path arbitration and transfer of a plurality of source signals to a destination signal path, is provided. An arbiter system includes an arbiter and a multiplexer. The multiplexer includes a plurality of n inputs each coupled to receive a source signal from one of a plurality of source signal paths and an output coupled to provide an output signal to the destination signal path. The multiplexer is controlled by a plurality of n select signal values received from the arbiter. The arbiter is coupled to receive a plurality of request signal values which prompt the arbiter to control the multiplexer to pass one of the source signals to the destination signal path. The multiplexer includes a plurality of n multiplexer signal paths each extending from one of n multiplexer inputs to the multiplexer output. Time characteristics of each of the n multiplexer signal paths are unequal. Request signal transfer times are required by the arbiter for providing a select signal value corresponding to each of the n request signal values. In the present invention, the time characteristics of the multiplexer signal paths and the request signal transfer times are matched such that an arbiter system transfer time, required to process one of the request signal values over the arbiter and pass a source signal from the corresponding multiplexer input to the multiplexer output, is approximately equal for each of the inputs to the multiplexer.

19 Claims, 4 Drawing Sheets

FIG. 1

(PRIOR ART)

FIG. 2

*(PRIOR ART)*

UNBALANCED MULTIPLEXER AND ARBITER COMBINATION

FIELD OF THE INVENTION

The present invention pertains to signal switching and routing in electronics systems. More particularly, the present invention relates to a high speed arbiter and multiplexer combination for signal transfer in synchronous digital logic circuits and systems.

BACKGROUND OF THE INVENTION

A vast variety of electronics systems include signal transfer devices for routing signals between components within a system and between components in different systems. A typical computer system, for example, comprises various components including central processing units (CPU's), input/output processing units, main memory, input/output devices, and peripheral devices. These components can be interconnected by a signal transfer device such as a bus or a switch. Another particularly common use for signal transfer devices and systems is in network routing environments.

Signal transfer devices can be distinguished by the manner in which signal transfers over the system are timed. In synchronous signal transfer systems, information is transferred during a time slot known in advance to both the source and destination units. Synchronous communication has the disadvantage that the time slots used for information transfer are largely determined by the slowest unit in the system. Therefore, faster devices may not be able to communicate at their maximum rate.

Figure 1:
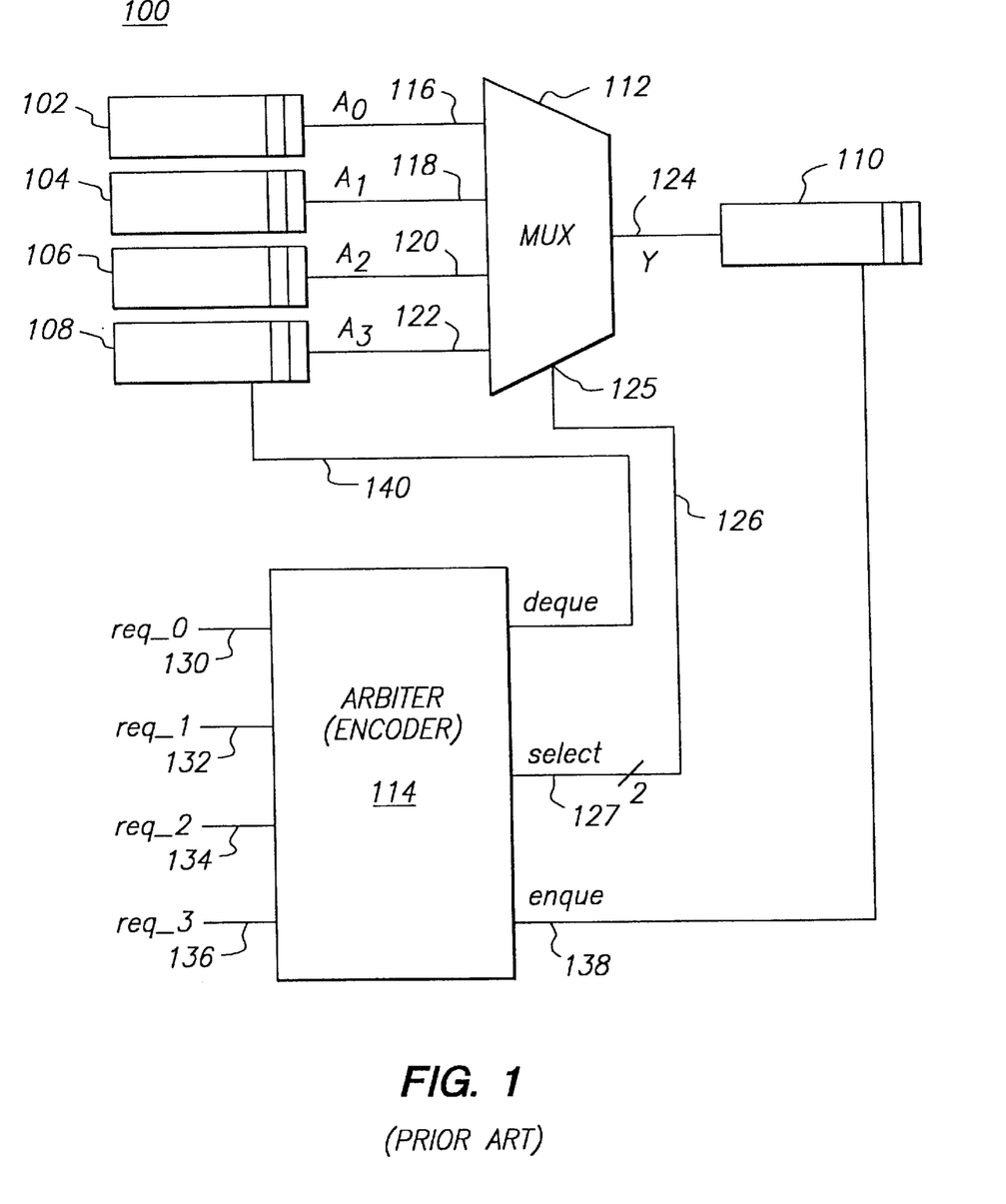
FIG. 1 is a circuit block diagram of a prior art signal path arbiter system including an arbiter and a time balanced multiplexer.

With reference to FIG. 1, a typical prior art signal path arbiter system 100 is shown. The arbiter system 100 is used to connect four source signal paths 102, 104, 106, and 108, synchronously and one at a time, to a single destination signal path 110. Each of the signal paths 102, 104, 106, 108, and 110 can carry digital data and control signals. For digital signal propagation, each of the signal paths 102, 104, 106, 108, and 110 can be a queue, a register, or a first in first out (FIFO) signal path. The arbiter system 100 includes a prior art time balanced multiplexer 112 and an arbiter 114. The multiplexer 112 includes four multiplexer inputs 116, 118, 120, and 122. Each of the four multiplexer inputs 116, 118, 120, and 122 is coupled to receive a source signal from one of the source signal paths 102, 104, 106, and 108. The first multiplexer input 116 is coupled to receive a source signal, A0, from the first source signal path 102. The second multiplexer input 118 is coupled to receive a source signal, A1, from the second source signal path 104. The third multiplexer input 120 is coupled to receive a source signal, A2, from the third source signal path 106. The fourth multiplexer input 122 is coupled to receive a source signal, A3, from the fourth source signal path 108. The multiplexer 112 also includes a multiplexer output 124. The destination signal path 110 is coupled to receive an output signal, Y, from the multiplexer output 124. The multiplexer 112 is controlled by a multiplexer select signal received from the arbiter 114. The multiplexer 112 includes a multiplexer select input 125 which is coupled to receive the select signal via a select bus 126. The select bus 126 is coupled to receive a select signal from a select output 127 of the arbiter 114. Typically, the arbiter 114 provides a dequeue control signal to the source signal paths 102, 104, 106, and 108 via a dequeue control bus 140. The arbiter 114 also typically provides an enqueue control signal to the destination signal path 110 via an enqueue control bus 138.

The arbiter 114 receives request signals which prompt the arbiter 114 to control the multiplexer 112 to pass a source signal from one of the source signal paths 102, 104, 106, and 108 to the destination signal path 110. The arbiter 114 includes four request inputs 130, 132, 134, and 136. The first request input 130 is coupled to receive a first request signal, req_0, which prompts the arbiter 114 to control the multiplexer 112 to pass the source signal, A0, from the first source signal path 102 to the destination signal path 110. The second request input 132 is coupled to receive a second request signal, req_1, which prompts the arbiter 114 to control the multiplexer 112 to pass the source signal, A1, from the second source signal path 104 to the destination signal path 110. The third request input 134 is coupled to receive a third request signal, req_2, which prompts the arbiter 114 to control the multiplexer 112 to pass the source signal, A2, from the third source signal path 106 to the destination signal path 110. The fourth request input 136 is coupled to receive a fourth request signal, req_3, which prompts the arbiter 114 to control the multiplexer 112 to pass the source signal, A3, from the fourth source signal path 108 to the destination signal path 110. Depending on which of the four request signals is active, the arbiter 114 provides an appropriate select signal value to the multiplexer 112, via the multiplexer select bus 126, to select the multiplexer input corresponding to the active request signal value.

The arbiter system 100 is a synchronous arbiter system and can be required to dispatch one request per clock cycle, steady state. Request signal paths extend through the arbiter 114 from each of the request inputs 130, 132, 134, and 136 to the select output 127 of the arbiter 114. Typically, the arbiter 114 is implemented as a priority encoder having four inputs and four outputs coupled to an encoder having four inputs and two outputs. A priority encoder includes the necessary logic to ensure that where two or more request input signals are concurrently active, the output select signal value will correspond to the request input signal which has a highest priority. Generally, the request signal paths vary in terms of the number of logic gates and the signal propagation delay though the paths. The timing characteristics of the request signal paths are therefore unbalanced. Typically, the request signal path having the smallest propagation delay is the highest priority request signal path and the request signal path having the greatest propagation delay is the lowest priority request signal path.

Normally, a signal transfer from one of the source signal paths 102, 104, 106, and 108 to the destination signal path 110 is made during a single clock cycle. For each of the four request signals, there is an arbiter system transfer time which is the time required to process a request signal over the arbiter 114 and steer the corresponding selected source signal through the multiplexer 112 to the destination signal path 110. Because the signal path arbiter system 100 is synchronous, the maximum clock frequency at which a signal transfer can be made in the arbiter system 100 is usually determined by the system transfer time corresponding to the request signal value having the greatest request signal transfer time (i.e., the slowest request signal value). Therefore, the period of the maximum clock frequency must be at least as long as the system transfer time corresponding to the slowest request signal value.

Figure 2:
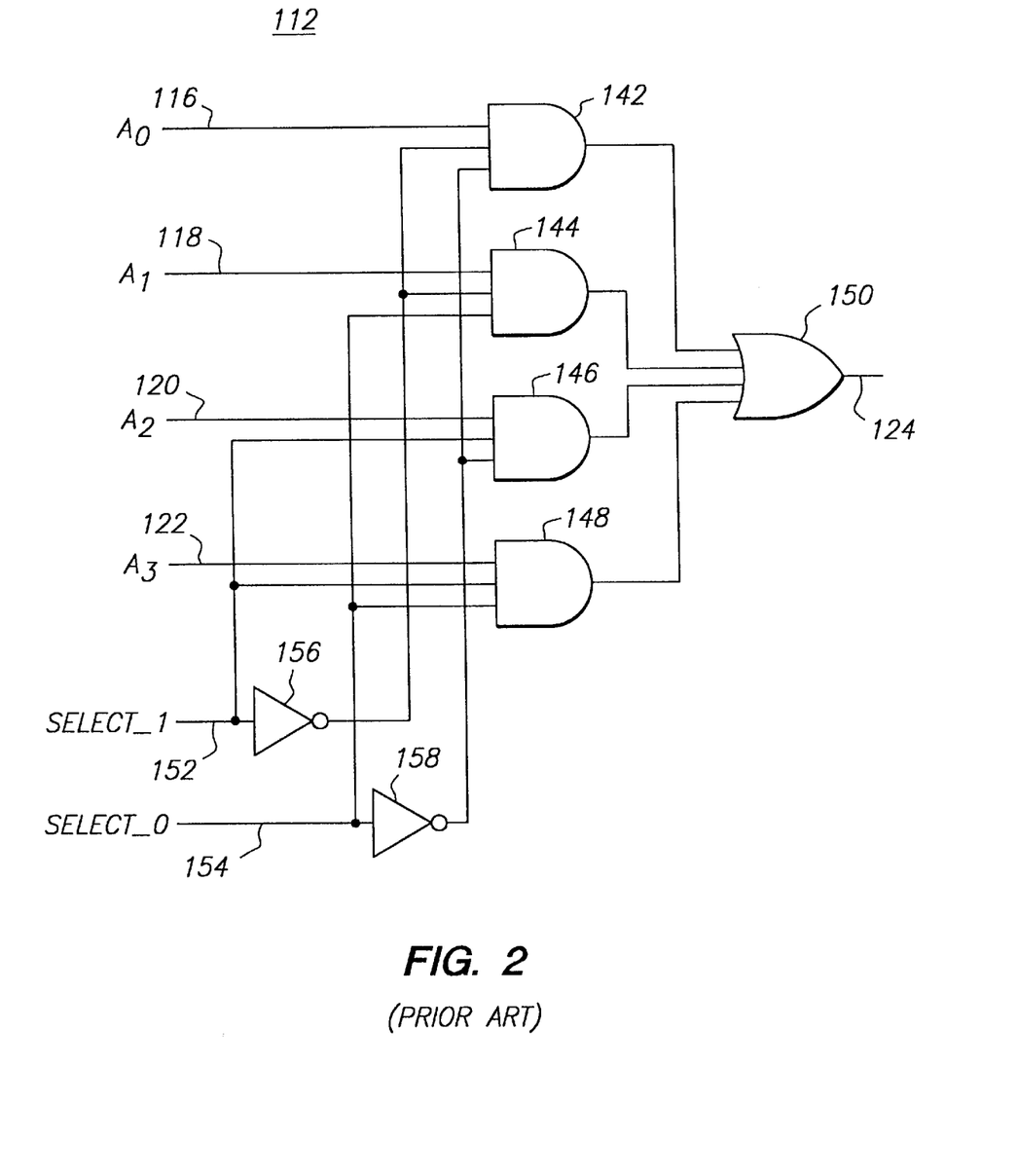
FIG. 2 is a logic circuit diagram of the prior art time balanced multiplexer.

With reference to FIG. 2, a logic circuit diagram of a typical prior art time balanced multiplexer 112 is shown. The multiplexer 112 includes four three-input AND gates 142, 144, 146, and 148, a four-input OR gate 150, and two NOT gates 156, 158. Each of the four AND gates 142, 144, 146, and 148 includes one of the four multiplexer inputs 116, 118, 120, and 122 which receive the source signals A0, A1, A2, and A3 respectively, as also shown in FIG. 1. The two NOT gates 156, 158 receive select output signals, signal_1 and select_0, respectively which alternate between logic high and logic low values to allow for four possible select signal values. Each of the four AND gates 142, 144, 146, and 148 further includes a pair of select inputs which receive signals from the NOT gates 156, 158. The select inputs 152, 154 comprise the multiplexer select input 125 of FIG. 1 which is coupled to the two line select bus 126 of FIG. 2. The four-input OR gate 150 receives an input signal from each of the AND gates 142, 144, 146, and 148. Each of the multiplexer inputs 116, 118, 120, and 122 and the multiplexer output 124 of the multiplexer 112 can be more than one signal line. Routing of the desired multiplexer input signal to the multiplexer output 124 is controlled by the select input lines 152, 154. The multiplexer 112 includes four multiplexer signal paths, one extending from each multiplexer input 116, 118, 120, and 122 to the multiplexer output 124. Each multiplexer signal path includes one of the three-input AND gates and the four-input OR gate 150. Because each of the multiplexer signal paths has the same number and type of logic gates, the propagation delays through each of the multiplexer signal paths are approximately equal. Because the propagation delays through each of the multiplexer signal paths are approximately equal, the multiplexer 112 has balanced time characteristics..

With reference back to FIG. 1, the signal path arbiter system 100 does not have balanced time characteristics because the time required to process each request signal value over the arbiter 114 and steer the corresponding source signal through the multiplexer 112 is variable for each request signal value. As previously stated, the period of the maximum clock frequency of the arbiter system 100 must be at least as long as the time required to process the slowest request signal over the arbiter 114 and steer the corresponding source signal from the selected source signal path through the multiplexer 112 to the destination signal path 110.

In a synchronous system, the maximum frequency of an arbiter system can limit the processing speed of the system employing the arbiter system. Therefore, it is desirable to minimize the overall signal transfer time of the slowest request signal path of an arbiter system even at the cost of increasing signal transfer times of faster request signal paths of the arbiter system.

In view of the foregoing, a faster arbiter system including an arbiter and an unbalanced multiplexer, having time characteristics corresponding to those of the arbiter, will be described.

SUMMARY OF THE INVENTION

The present invention provides a method and apparatus for high speed signal path arbitration and transfer of a plurality of source signals from a plurality of n source signal paths to a destination signal path. An arbiter system includes an arbiter and a multiplexer. The multiplexer includes a plurality of n inputs each coupled to receive a source signal from one of the plurality of source signal paths and an output coupled to provide an output signal to the destination signal path. The multiplexer is controlled by a plurality of n select signal values received from the arbiter. The arbiter is coupled to receive a plurality of request signal values which prompt the arbiter to control the multiplexer to pass one of the source signals to the destination signal path.

The multiplexer includes a plurality of n multiplexer signal paths each extending from one of n multiplexer inputs to the multiplexer output. In an embodiment of the present invention, time characteristics of each of the n multiplexer signal paths are unequal. Request signal transfer times are required by the arbiter for providing a select signal value corresponding to each of the n request signal values. In the present invention, the time characteristics of the multiplexer signal paths and the request signal transfer times are matched such that an arbiter system transfer time, required to process one of the request signal values over the arbiter and pass a source signal from the corresponding multiplexer input to the multiplexer output, is approximately equal for each of the inputs to the multiplexer. Where the signal path arbiter system of the present invention is used in a synchronous system, the system transfer times, corresponding to each of the request signal values, are minimized so that the speed of the arbiter system is maximized.

In an embodiment of the present invention, n is equal to four and the arbiter is an unbalanced priority encoder which provides four select signal values each activated by one of four request signal values. An arbiter request signal path extends from each of four request inputs to a plurality of select outputs. The four request signal paths vary in terms of timing characteristics. An unbalanced four input multiplexer, having timing characteristics matching the timing characteristics of this unbalanced arbiter, is also provided. The unbalanced four input multiplexer includes four AND gates and three OR gates. A first AND gate includes a first input coupled to receive one of the four source signals and a second input coupled to receive a first select signal value from the arbiter. A second AND gate includes a first input coupled to receive one of the four source signals and a second input coupled to receive a second select signal value from the arbiter. A third AND gate includes a first input coupled to receive one of the four source signals and a second input coupled to receive a third select signal value from the arbiter. A fourth AND gate includes a first input coupled to receive one of the four source signals and a second input coupled to receive a fourth select signal value from the arbiter. A first OR gate includes a first input coupled to receive an output signal from the first AND gate and a second input coupled to receive an output signal from the second AND gate. A second OR gate includes a first input coupled to receive an output signal from the first OR gate and a second input coupled to receive an output signal from the third AND gate. A third OR gate includes a first input coupled to receive an output signal from the second OR gate and a second input coupled to receive an output signal from the fourth AND gate. The third OR gate provides the multiplexer output.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following detailed description of the present invention, a time balanced multiplexer/arbiter combination, numerous specific details are set forth in order to provide a thorough understanding of the present invention. However, it will be obvious to one skilled in the art that the present invention may be practiced without these specific details or by using alternate elements or processes. In other instances well known processes, procedures, components, and circuits have not been described in detail so as not to unnecessarily obscure aspects of the present invention.

The present invention provides a method and apparatus for high speed signal path arbitration and transfer of a plurality of source signals from a plurality of n source signal paths to a destination signal path. An arbiter system includes an arbiter and a multiplexer combination for synchronously connecting a plurality of n source signal paths to a destination signal path. The multiplexer includes a plurality of n inputs each coupled to receive a source signal from one of the plurality of n source signal paths and an output coupled to provide an output signal to the destination signal path. The multiplexer is controlled by a plurality of n select signal values received from the arbiter. The arbiter includes a plurality of n request inputs each coupled to receive one of the plurality of n request signal values which prompt the arbiter to control the multiplexer to pass one of the source signals to the destination signal path. The arbiter and the multiplexer have matched time characteristics such that a system transfer time, the time required to process a request signal value over the arbiter and steer the corresponding selected source signal through the multiplexer to the destination signal path, is approximately equal for each of the request signal values and corresponding selected source signals. In a synchronous arbiter system, the largest system transfer time limits the maximum frequency of the arbiter system. In the arbiter system of the present invention, the system transfer times, corresponding to each of the request signal values, are minimized so that the speed of the arbiter system is maximized.

Figure 3:
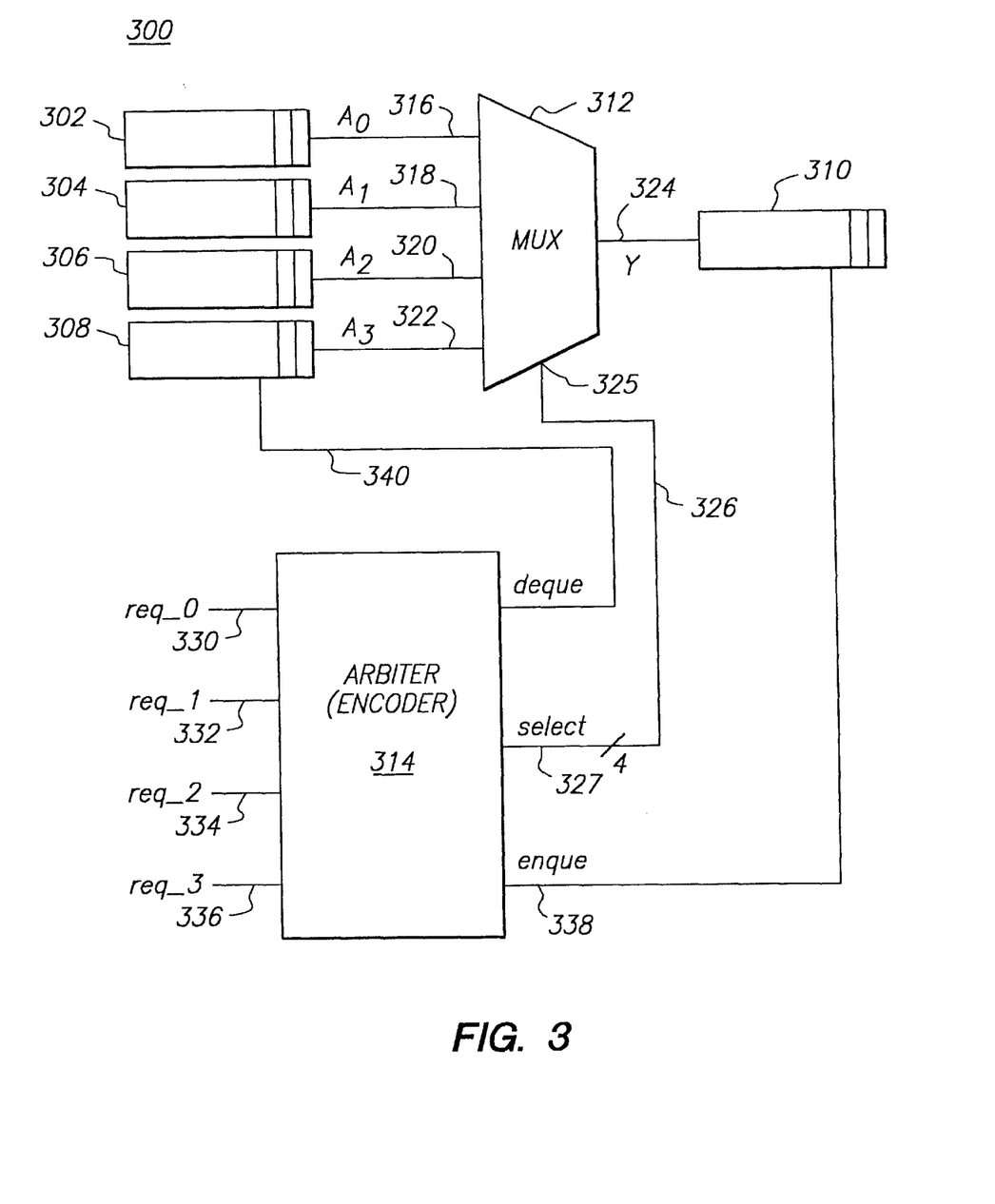
FIG. 3 is a circuit block diagram of a time balanced signal path arbiter system including an unbalanced arbiter and a time skewed multiplexer according to the present invention.

With reference to FIG. 3, a signal path arbiter system 300 according to one embodiment of the present invention is shown. The arbiter system 300 is used to connect a plurality of n=4 source signal paths 302, 304, 306, and 308, synchronously and one at a time, to a single destination signal path 310. Each of the signal paths 302, 304, 306, 308, and 310 can carry analog or digital data and control signals. Sources for the signal paths 302, 304, 306, 308, and 310 can be any suitable signal source, as for example, signal paths 302, 304, 306, 308, and 310 can be a queue, a register, or a first in first out (FIFO) signal path. The arbiter system 300 includes a time skewed multiplexer 312 and an arbiter 314. The multiplexer 312 includes four multiplexer inputs 316, 318, 320, and 322. Each of the four multiplexer inputs 316, 318, 320, and 322 is coupled to receive a source signal from one of the source signal paths 302, 304, 306, and 308. The first multiplexer input 316 is coupled to receive a source signal, A0, from the first source signal path 302. The second multiplexer input 318 is coupled to receive a source signal, A1, from the second source signal path 304. The third multiplexer input 320 is coupled to receive a source signal, A2, from the third source signal path 306. The fourth multiplexer input 322 is coupled to receive a source signal, A3, from the fourth source signal path 308. The multiplexer 312 also includes a multiplexer output 324. The destination signal path 310 is coupled to receive an output signal, Y, from the multiplexer output 324. The multiplexer 312 is controlled by a multiplexer select signal received from the arbiter 314. The multiplexer 312 includes a multiplexer select input 325 which is coupled to receive the select signal via a select bus 326. In the described embodiment of the present invention, select signal values include four bits and the select signal bus includes four lines. The select bus 326 is coupled to receive a select signal from a select output 327 of the arbiter 314. In an embodiment of the present invention, the arbiter 314 can provide a dequeue control signal to the source signal paths 302, 304, 306, and 308 via a dequeue control bus 340. The arbiter 314 can also provide an enqueue control signal to the destination signal path 310 via an enqueue control bus 338.

The arbiter 314 receives request signal values which prompt the arbiter 314 to control the multiplexer 312 to connect one of the source signal paths 302, 304, 306, and 308 to the destination signal path 310 via the multiplexer 312. In the described embodiment of the present invention, the arbiter 314 includes four request inputs 330, 332, 334, and 336. The first request input 330 is coupled to receive a first request signal, req_0, which prompts the arbiter 314 to control the multiplexer 312 to pass the source signal, A0, from the first source signal path 302 to the destination signal path 310. The second request input 332 is coupled to receive a second request signal, req_1, which prompts the arbiter 314 to control the multiplexer 312 to pass the source signal, A1, from the second source signal path 304 to the destination signal path 310. The third request input 334 is coupled to receive a third request signal, req_2, which prompts the arbiter 314 to control the multiplexer 312 to pass the source signal, A2, from the third source signal path 306 to the destination signal path 310. The fourth request input 336 is coupled to receive a fourth request signal, req_3, which prompts the arbiter 314 to control the multiplexer 312 to pass the source signal, A3, from the fourth source signal path 308 to the destination signal path 310. Depending on which of the four request signals is active, the arbiter 314 provides an appropriate select signal to the multiplexer 312 via the multiplexer select bus 326 to select the multiplexer input corresponding to the source signal path indicated by the active request signal.

Figure 4:
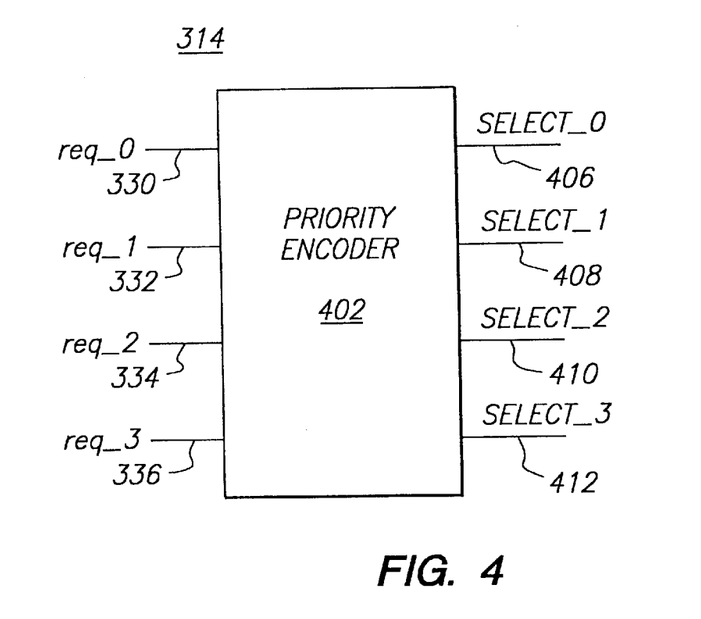
FIG. 4 is a circuit block diagram of an arbiter comprising a priority encoder used in an embodiment of the arbiter system of the present invention.

With reference to FIG. 4, the arbiter 314 is shown according to one embodiment of the present invention in which the arbiter 314 is a priority encoder 402. The priority encoder 402 includes the four request inputs 330, 332, 334, and 336 of FIG. 3 which are respectively coupled to receive the four request signals; req_0, req_1, req_2, and req_3. The priority encoder 402 also includes four select outputs 406, 408, 410, and 412 which provide select signals to the multiplexer 312 of FIG. 3. The first select output 406 provides a select_0 signal. The second select output 408 provides a select _1 signal. The third select output 410 provides a select_2 signal. The fourth select output 412 provides a select_3 signal. The four select outputs 406, 408, 410, and 412 of the priority encoder 402 comprise the select output 327 of the arbiter 314 of FIG. 3. The four select signals, select_0, select_1, select_2, and select_3, are transmitted over the four line select bus 326 of FIG. 3. The priority encoder 402 includes the necessary logic to ensure that where two or more request input signals are concurrently active, the output select signal line activated will correspond to the request input signal which has a highest priority.

In one embodiment of the present invention, relationships between the four select output signals from the priority encoder 402 and the four request input signals to the priority encoder 402 are defined by Boolean Relationships (1), (2), (3), and (4), below.

select_0=req_0 (1)

select_1=!req_0 & req_1 (2)

select_2=!req_0 & !req_1 & req_2 (3)

select_3=!req_0 & !req_1 & !req_2 & req_3 (4)

With reference to Boolean relationships (1), (2), (3), and (4), above, the exclamation sign, "!", denotes a Boolean inversion operation and the ampersand sign, "&" denotes a Boolean "AND" operation. Each of the select signal values output from the priority encoder 402 are mutually exclusive. That is, only one of the four select signal values can be activated at a time.

With reference still to FIG. 4, an arbiter request signal path extends from each of the request inputs 330, 332, 334, and 336 to the select outputs 406, 408, 410, and 412 respectively of the arbiter 314. A signal propagation delay through each request signal path is proportional to the number of logic gates along the path. The four request signal paths vary in terms of the number of logic gates along each path. With reference to the Boolean Relationships (1), (2), (3), and (4), above, it is evident that the request signal path corresponding to req_0 has the fewest terms and can therefore be implemented with the smallest number of logic gates. The request signal path corresponding to req_0 has the smallest signal propagation delay. The request signal path corresponding to req_4 has the most terms and therefore must implemented with the largest number of logic gates. The request signal path corresponding to req_4 has the greatest signal propagation delay. The request signal path corresponding to req_2 has the second smallest signal propagation delay and the request signal path corresponding to req_3 has the third smallest signal propagation delay. The timing characteristics of the four arbiter request signal paths are therefore unbalanced. In an embodiment of the present invention, the request signal path with the shortest propagation delay is the highest priority signal path and the request signal path with the longest propagation delay is the lowest priority path.

With reference back to FIG. 3, the arbiter system 300 is a synchronous arbiter system and can be required to dispatch one request for a signal transfer per clock cycle, steady state. Normally, a signal transfer from one of the source signal paths 302, 304, 306, and 308 to the destination signal path 310 is made during a single clock cycle. For each of the four request signal values, there is an arbiter system transfer time which is the time required to process a request signal over the arbiter 314 and steer the corresponding selected source signal through the multiplexer 312 to the destination signal path 310. The maximum clock frequency at which signal transfers can be made in the arbiter system 300 is determined by greatest system transfer time (i.e., the system transfer time of the slowest request signal value). The period of the maximum clock frequency of the arbiter system 300 must be at least as long as the time required to process the slowest request signal over the arbiter 314 and steer the corresponding source signal from the selected source signal path through the multiplexer 312 to the destination signal path 310.

In a time balanced arbiter system, the system transfer time corresponding to each request signal value is approximately equal. In the arbiter system 300 of the present invention is, the arbiter 314 and multiplexer 312 have matched time characteristics. That is, the time characteristics of each request signal path of the unbalanced arbiter 314 and the time characteristics of each multiplexer signal path of the multiplexer 312 are matched such that the system transfer times for each request signal value, and corresponding selected source signal, are approximately equal. Also, in the arbiter system 300 of the present invention, the system transfer times corresponding to each of the requested source signal values are minimized so that the speed of the arbiter system 300 is maximized.

Figure 5:
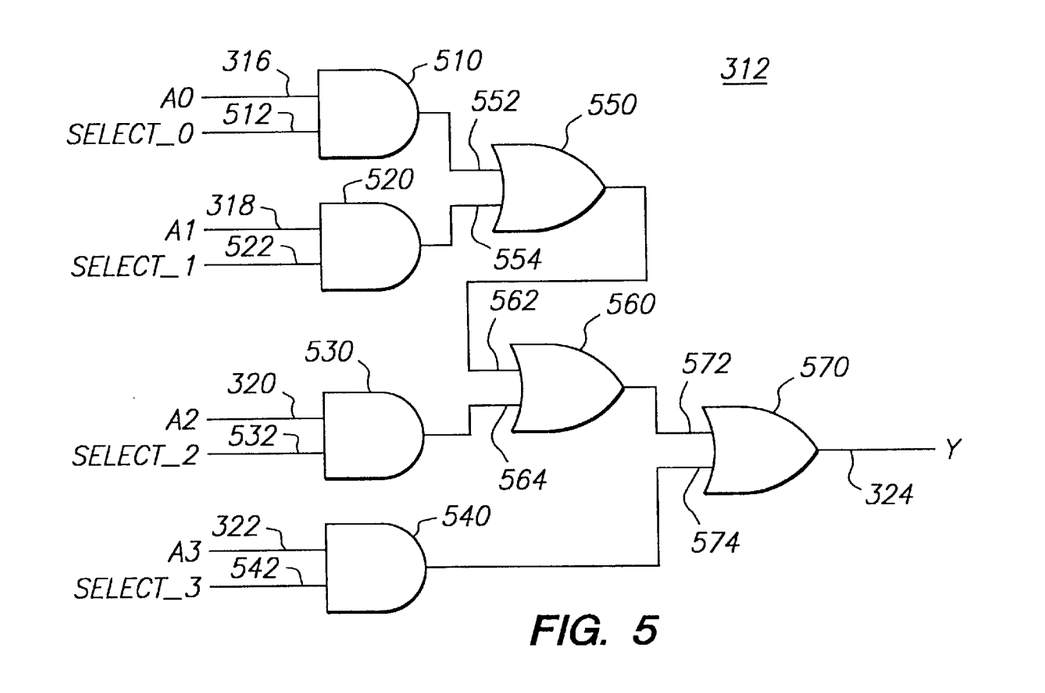
FIG. 5 is a logic circuit diagram of a time skewed multiplexer according to the present invention for use in a time balanced signal path arbiter system.

With reference to FIG. 5, a logic circuit diagram of one embodiment of the time skewed multiplexer 312 is shown. The multiplexer 312 includes four two-input AND gates 510, 520, 530, and 540, and three two-input OR gates 550, 560, and 570. Each of the four AND gates 510, 520, 530, and 540 includes one of the four multiplexer inputs 316, 318, 320, and 322 which receive the source signals A0, A1, A2, and A3 respectively, as also shown in FIG. 3. Each of the four AND gates 510, 520, 530, and 540 further includes a select input which receives one of the select signals from the priority encoder 402 of FIG. 4. The first AND gate 510 includes a select input 512 which receives the select_0 signal. The second AND gate 520 includes a select input 522 which receives the select_1 signal. The third AND gate 530 includes a select input 532 which receives the select_2 signal. The fourth AND gate 540 includes a select input 542 which receives the select_3 signal. With reference back to FIG. 3, the four select inputs 512, 522, 532, and 542 of FIG. 5 comprise the multiplexer select input 325 of FIG. 3 which is coupled to the four line select bus 326 of FIG. 3.

With reference still to FIG. 5, the first OR gate 550 includes a first input 552 coupled to receive an output signal from the first AND gate 510. The first OR gate 550 also includes a second input 554 coupled to receive an output signal from the second AND gate 520. The second OR gate 560 includes a first input 562 coupled to receive an output signal from the first OR gate 550. The second OR gate 560 also includes a second input 564 coupled to receive an output signal from the third AND gate 530. The third OR gate 570 includes a first input 572 coupled to receive an output signal from the second OR gate 560. The third OR gate 570 also includes a second input 574 coupled to receive an output signal from the fourth AND gate 540. The third OR gate 570 further includes the multiplexer output 324 which is also shown in FIG. 3.

With reference still to FIG. 5, the time skewed multiplexer 312 receives the source signals, A0, A1, A2, and A3 and selects one of them at a time to pass on to the multiplexer output 324. Each of the multiplexer inputs 316, 318, 320, and 322 and the multiplexer output 324 of the multiplexer 312 can be more than one signal line. Routing of the desired multiplexer input signal to the multiplexer output is controlled by the four select input lines 512, 522, 532, and 542 which can receive the select signals from the arbiter 314 of FIG. 3.

A first multiplexer signal path, extending from the first multiplexer input 316 to the multiplexer output 324 includes the AND gate 510 and the three OR gates 550, 560, and 570. A second multiplexer signal path, extending from the second multiplexer input 318 to the multiplexer output 324 includes the AND gate 520 and the three OR gates 550, 560, and 570. A third multiplexer signal path, extending from the third multiplexer input 320 to the multiplexer output 324, includes the AND gate 530 and the two OR gates 560, and 570. A fourth multiplexer signal path, extending from the fourth multiplexer input 322 to the multiplexer output 324, includes the AND gate 540 and the OR gate 570. Because each of the multiplexer signal paths does not have the same number and type of logic gates, the propagation delays through each of the multiplexer signal paths are not equal. Because the propagation delays through each multiplexer signal path are not approximately equal, the multiplexer 312 is said to have unbalanced or skewed, time characteristics.

In the arbiter system 300 of the present invention, the unbalanced arbiter 314 and the time skewed multiplexer 312 have matched time characteristics such that the arbiter system 300 of the present invention is time balanced. That is, in the arbiter system 300 of the present invention, the system transfer time corresponding to each request signal value is approximately equal. Also, in the arbiter system 300 of the present invention, the system transfer times corresponding to each of the request signal values are minimized so that the speed of the arbiter system 300 is maximized.

In the described embodiment of the present invention, the arbiter system 300 mincludes a time skewed multiplexer 312 having n=4 inputs and n=4 multiplexer signal paths to match the time characteristics of each of four request signal paths of the unbalanced arbiter 314 such that the system transfer times corresponding to each of four request signal values are approximately equal. However, it is understood that in the present invention, a time skewed multiplexer having any number of n inputs can be used to match time characteristics of a time unbalanced arbiter such that the system transfer times corresponding to a plurality of n request signal values are approximately equal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An arbiter system comprising:
   an unbalanced multiplexer including a plurality of multiplexer inputs, a select input, and a plurality multiplexer signal paths each extending from an associated one of said multiplexer inputs to an output of said multiplexer, wherein time characteristics of each of said multiplexer signal paths are unequal; and
   an arbiter coupled to receive a plurality of request signal values which prompt said arbiter to control said multiplexer, via a select signal, to select one of said multiplexer inputs, said arbiter requiring a request signal transfer time to provide a select signal value corresponding to each of said plurality of request signal values.

2. The arbiter system of claim 1 wherein said time characteristics of said multiplexer signal paths and said request signal transfer times are matched such that a system transfer time, required to process one of said request signal values through said arbiter and pass a selected source signal from its corresponding multiplexer input to said multiplexer output, is approximately equal for each of said multiplexer inputs.

3. The arbiter system of claim 2 wherein said system transfer times corresponding to each of said multiplexer inputs are minimized so that the speed of said arbiter system is maximized.

4. The arbiter system of claim 1 wherein said request signal transfer times, corresponding to each of said plurality of request signal values, increase as the priority of said request signal values decrease.

5. The arbiter system of claim 1 wherein four multiplexer inputs are provided, said arbiter is a priority encoder, and relationships between four select signal values, select_0, select_1, select_2, and select_3, from said arbiter and four request signal values, req_0, req_1, req_2, and req_3, of said arbiter are defined by:

select_0=req_0, select_1=!req_0 & req_1, select_2=!req_0 & !req_1 & req_2, and select_3=!req_0 & !req_1 & !req_2 & req_3.

6. The arbiter system of claim 5 wherein said multiplexer comprises:
   a first AND gate including a first input coupled to receive a first source signal and a second input coupled to receive said select_0 signal;
   a second AND gate including a first input coupled to receive a second source signal and a second input coupled to receive said select_1 signal;
   a third AND gate including a first input coupled to receive a third source signal and a second input coupled to receive said select_2 signal;
   a fourth AND gate including a first input coupled to receive a fourth source signal and a second input coupled to receive said select_3 signal;
   a first OR gate including a first input coupled to receive an output signal from said first AND gate and a second input coupled to receive an output signal from said second AND gate;
   a second OR gate including a first input coupled to receive an output signal from said first OR gate and a second input coupled to receive an output signal from said third AND gate; and
   a third OR gate including a first input coupled to receive an output signal from said second OR gate and a second input coupled to receive an output signal from said fourth AND gate, said third OR gate providing said output of said multiplexer.

7. The arbiter system of claim 1 further comprising:
   a plurality of source queues, each source queue being coupled to an associated one of said multiplexer inputs to provide a source signal to its associated multiplexer input; and
   a destination queue coupled to receive an output signal from the output of said multiplexer.

8. The arbiter system of claim 7 wherein said arbiter provides:
   a dequeue control signal to said source queues; and
   an enqueue control signal to said destination queue.

9. The arbiter system of claim 1 further comprising:
   a plurality of source registers, each source registers being coupled to an associated one of said multiplexer inputs to provide a source signal to its associated multiplexer input; and
   a destination register coupled to receive an output signal from the output of said multiplexer.

10. The arbiter system of claim 7 wherein said arbiter provides:
    a clock control signal to said source registers; and
    a clock control signal to said destination register.

11. An arbiter system comprising:
a multiplexer including a plurality of n inputs coupled to receive a plurality of source signals and providing an output signal;
an arbiter coupled to receive a plurality of n request signal values which prompt said arbiter to control said multiplexer, via a select signal, to output one of said source signals; and
wherein said arbiter and said multiplexer have matched time characteristics such that a system transfer time, required to process one of said n request signal values through said arbiter and steer said corresponding source signal through said multiplexer, is approximately equal for each of said n request signal values.

12. The arbiter system of claim 11 wherein said multiplexer includes a plurality of n multiplexer signal paths each extending from an associated one of said n inputs of said multiplexer to an output of said multiplexer wherein time characteristics of each of said n multiplexer signal paths are unequal.

13. The arbiter system of claim 11 wherein said system transfer times corresponding to each of said plurality of n request signal values are minimized so that the speed of said arbiter system is maximized.

14. The arbiter system of claim 11 wherein n is equal to four, said arbiter is a priority encoder, and relationships between four select output signal values, select_0, select_1, select_2, and select_3, from said arbiter and four request input signal values, req_0, req_1, req_2, and req_3, of said arbiter are defined by;

$$select\_0 = req\_0,$$
$$select\_1 = !req\_0 \;\&\; req\_1,$$
$$select\_2 = !req\_0 \;\&\; !req\_1 \;\&\; req\_2, \text{ and}$$
$$select\_3 = !req\_0 \;\&\; !req\_1 \;\&\; !req\_2 \;\&\; req\_3.$$

15. The arbiter system of claim 14 wherein said multiplexer comprises:
a first AND gate including a first input coupled to receive one of said source signals and a second input coupled to receive said select_0 signal;
a second AND gate including a first input coupled to receive one of said source signals and a second input coupled to receive said select_1 signal;
a third AND gate including a first input coupled to receive one of said source signals and a second input coupled to receive said select_2 signal;
a fourth AND gate including a first input coupled to receive one of said source signals and a second input coupled to receive said select_3 signal;
a first OR gate including a first input coupled to receive an output signal from said first AND gate and a second input coupled to receive an output signal from said second AND gate;
a second OR gate including a first input coupled to receive an output signal from said first OR gate and a second input coupled to receive an output signal from said third AND gate; and
a third OR gate including a first input coupled to receive an output signal from said second OR gate and a second input coupled to receive an output signal from said fourth AND gate, said third OR gate providing said output signal of said multiplexer.

16. The arbiter system of claim 11 further comprising:
a plurality of source queues coupled to provide said plurality of source signals to said plurality of n inputs of said multiplexer;
a destination queue coupled to receive said output signal from said multiplexer; and
wherein said arbiter provides a dequeue control signal to said plurality of source queues and an enqueue control signal to said destination queue.

17. The arbiter system of claim 11 further comprising:
a plurality of source registers coupled to provide said plurality of source signals to said plurality of n inputs of said multiplexer;
a destination register coupled to receive said output signal from said multiplexer; and
wherein said arbiter provides a clock control signal to said source registers and said destination register.

18. A method for fast arbitration and transfer of a plurality of source signals to a destination signal path, said method comprising the steps of:
coupling a plurality of n multiplexer inputs of a multiplexer to receive the plurality of source signals, said multiplexer including a plurality of n multiplexer signal paths each extending from one of said plurality of n multiplexer inputs to an output of said multiplexer;
coupling an arbiter to receive a plurality of n request signal values each of which prompt said arbiter to control said multiplexer, via a select signal, to select one of said n multiplexer inputs, said arbiter requiring separate request signal transfer times to process each one of said request signal values through said arbiter and provide a corresponding select signal value; and
matching said time characteristics of said multiplexer signal paths and said request signal transfer times so that a system transfer time, required to process one of said request signal values through said arbiter and pass one of said source signals from said corresponding multiplexer input to said multiplexer output, is approximately equal for each of said multiplexer inputs.

19. The method of claim 18 comprising the further step of minimizing said system transfer times corresponding to each of said multiplexer inputs so that the speed of the method for arbitration and transfer is maximized.

* * * * *